T. BUSHEY.
ANIMAL TRAP.
APPLICATION FILED MAY 21, 1908.
903,356.
Patented Nov. 10, 1908.
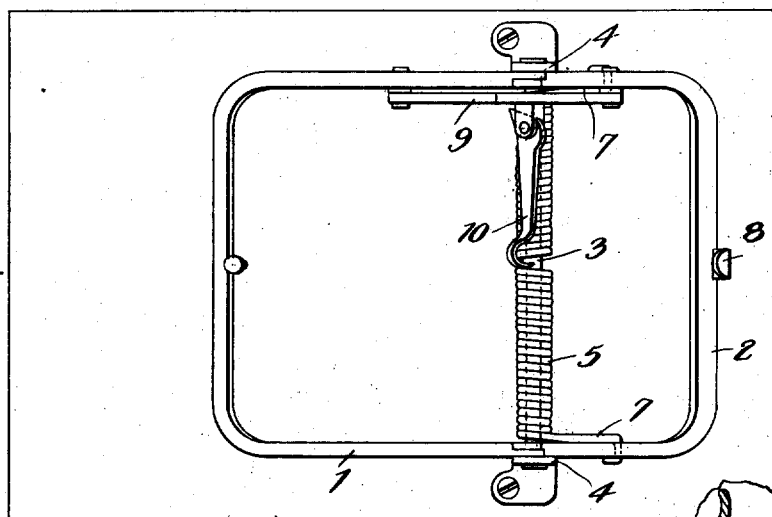
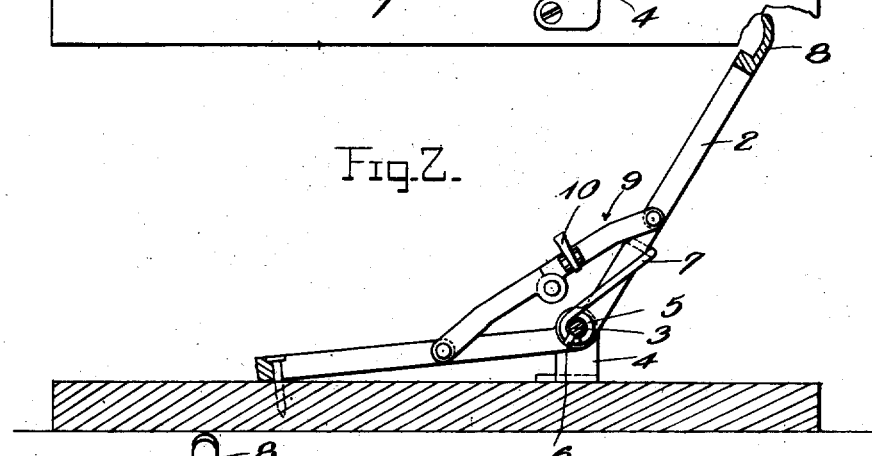
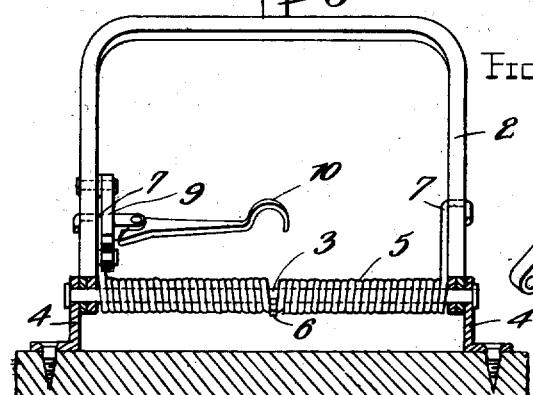
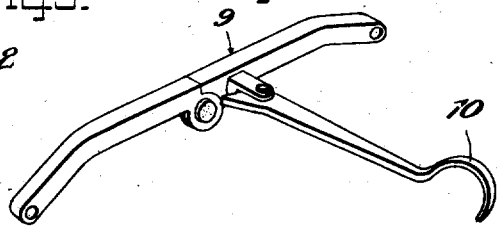
Witnesses
Inventor
Thomas Bushey
By
Attorneys

UNITED STATES PATENT OFFICE.

THOMAS BUSHEY, OF MUNISING, MICHIGAN.

ANIMAL-TRAP.

No. 903,356.　　　Specification of Letters Patent.　　　Patented Nov. 10, 1908.

Application filed May 21, 1908. Serial No. 434,119.

*To all whom it may concern:*

Be it known that I, THOMAS BUSHEY, a citizen of the United States, residing at Munising, in the county of Alger and State of Michigan, have invented certain new and useful Improvements in Animal-Traps; and I do declare the following to be a full, clear, and exact description of the invention, such as will enable others skilled in the art to which it appertains to make and use the same.

My invention relates to improvements in animal traps.

It has for its object to secure the aforesaid purpose in a simple and effective manner, and whereby the animal will be entrapped with its head inclosed and the force of the entrapping action brought upon its neck.

With these and other objects in view, the invention consists of certain novel features of construction, combination and arrangement of parts as will be described and particularly pointed out in the appended claims.

In the accompanying drawing, illustrating the preferred embodiment of my invention, Figure 1 is a plan view of the device set ready for use; Fig. 2 is a vertical longitudinal sectional view thereof; Fig. 3 is a cross sectional view produced through the axis of the trap members, together with its spring; Fig. 4 is a perspective view of the bait suspending hook and its bracket for attachment to one of the trap members, together with the knuckle jointed trap holding means or lever.

In practicing my invention I employ two bail-like members, 1, 2, the lower one of which is suitably fixed in position and made stationary upon the base upon which the trap may be placed, said members being pivoted together at their free ends by means of a common axis or pintle, 3, passing therethrough and supported in ears, or brackets, 4, suitably secured to said base. Said axis or pintle has applied thereto preferably a coiled or helical spring, 5, with its central looped portion receiving a lateral stud, 6, from said pintle or axis, for its retention in effective position at that point, said spring having its ends terminating in arms, 7, caught over the upper trap member or bail for delivering the tension of said spring thereon. Said upper trap member or bail, for convenience in setting the trap, has a thumb piece, 8, projecting from its forward edge and whereby, by applying suitable pressure upon said thumb piece, said upper trap member may be extended as in setting the trap.

A knuckle jointed member or lever, 9, has its respective sections pivoted to the trap members or bails for propping or holding the upper trap member in extended position, while said propping lever or member is adapted, by reason of its knuckle or angle joint, to be retained in extended position as in holding said upper trap member in extended position.

A bait suspending hook, 10, is pivotally connected to a lug or ear, 11, fixed to one section of said angle jointed lever or prop to permit said hook to be swung laterally out of the way of the entrapped head of the animal as said animal attempts to secure the bait upon the hook, and thus permit the engagement of the trap member to deliver its force upon or engage the neck of the animal, the head of the animal being received within the entrapping bail member.

In applying the device for use it may be fastened at the bottom of a tree or stump, or to a pole or stake, and located near the edge of a body of water or water course, the bait suspending hook having been suitably baited previous to setting the trap and adjusted in position for engagement by the animal.

It will be seen from the foregoing disclosure of parts, that a very effective, simple and economical trap is provided for its intended purpose, namely, for entrapping more especially fur-bearing animals.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim as new and desire to secure by Letters-Patent, is:

1. A trap comprising bail-like members, a pintle for connecting said members together, a spring applied to said pintle and adapted to deliver its pressure upon one of said bail members, a jointed propping lever pivoted to said bail members, and a bait suspending hook pivoted to said propping lever and adapted to swing laterally.

2. A trap comprising bail-like trap members, one being fixed to a support therefor, a pintle effecting connection between said bail-like trap members, a spring applied to said pintle and having arm terminals engaging the upper of said trap members for delivering the pressure of said spring thereon, a jointed prop lever pivoted to said trap members and adapted in extended position to hold one of said trap members in set or extended position, and a bait suspending hook having pivotal connection with said propping lever.

In testimony whereof I have hereunto set my hand in presence of two subscribing witnesses.

THOMAS $\overset{\text{his}}{+}$ BUSHEY.
$\phantom{THOMAS\ }{\scriptstyle\text{mark}}$ Witnesses:
 FRANK H. CASKANETT,
 JULES GEOFFRAY.